Aug. 28, 1962 G. J. SUNDQUIST ETAL 3,051,292
MATERIAL HANDLING APPARATUS
Filed June 13, 1960
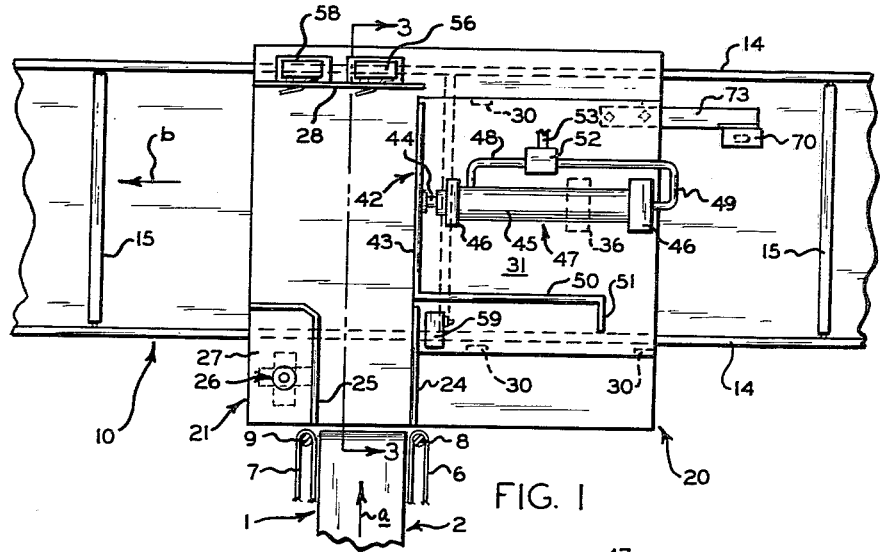
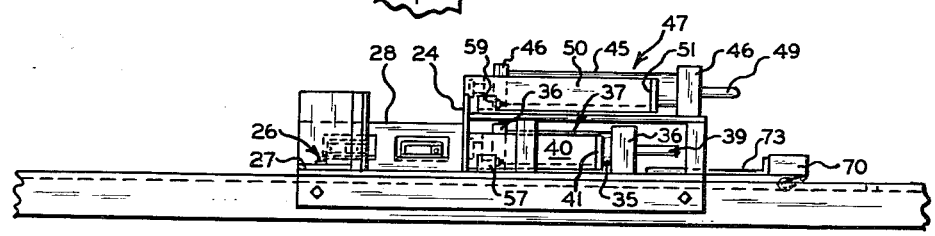
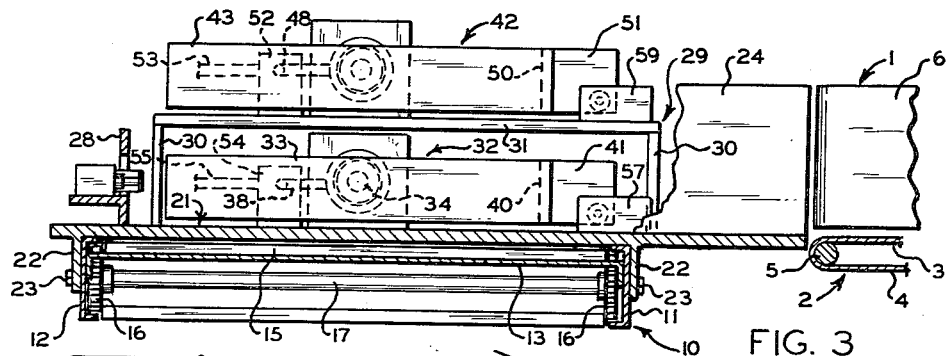
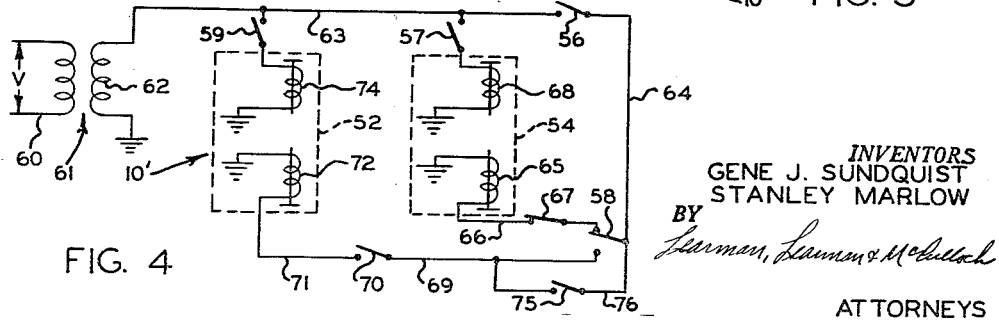
INVENTORS
GENE J. SUNDQUIST
STANLEY MARLOW
BY
*Learman, Learman & McCulloch*
ATTORNEYS : 3,051,292
Patented Aug. 28, 1962

3,051,292
MATERIAL HANDLING APPARATUS
Gene J. Sundquist, 56 W. Hannum, and Stanley Marlow,
3200 Weigl Road, both of Saginaw, Mich.
Filed June 13, 1960, Ser. No. 35,725
6 Claims. (Cl. 198—31)

This invention relates to material handling apparatus and more particularly to apparatus adapted for use in conjunction with a delivery conveyor and a discharge conveyor and capable of receiving goods from the delivery conveyor and loading them on the discharge conveyor in timed relation to the rate of travel of the latter. The apparatus also is operable to receive goods in single file from the delivery conveyor and selectively load a line of single file goods on the discharge conveyor or, alternatively, accumulate a plurality of lines of goods prior to loading the discharge conveyor.

In many manufacturing plants similar products are packaged in a variety of sizes and all of the different size containers are adapted to be handled by the same boxing, wrapping and packaging apparatus. Where such machinery is used with conveyors, synchronization problems are encountered in changing from one size product to another. For example, ice cream manufacturers package the product in multiple sizes, such as pints, quarts and half gallons. A carton adapted to contain a dozen half gallon packages of ice cream, for example, is capable of being packed with twice as many quart packages, but if the conveyor equipment is timed to handle half gallon packages, substantially more time will be required to load the cartons with quart packages than is required to load the cartons with half gallon packages, assuming that the speed of the conveyors remains the same.

An object of this invention is to provide material handling apparatus adapted to be so positioned relatively to delivery and discharge conveyors as to receive goods from the delivery conveyor and selectively discharge them to the discharge conveyor immediately or accumulate a plurality of the goods on the apparatus prior to their discharge to the discharge conveyor.

Another object of the invention is to provide apparatus of the kind referred to wherein the loading of the goods on the discharge conveyor is timed to the rate of travel of the latter.

A further object of the invention is to provide a material handling apparatus of the kind described wherein control apparatus of simplified and reliable construction is provided to regulate the loading and accumulating actions of the apparatus.

Another object of the invention is to provide article accumulating and loading apparatus which is economical to manufacture, easy to operate, and rugged and durable in use.

Other objects and advantages of the invention will be pointed out specifically or will become apparent from the following description when it is considered in conjunction with the appended claims and the accompanying drawing, in which:

FIGURE 1 is a fragmentary, top plan view of apparatus constructed in accordance with the invention and arranged to receive articles from a delivery conveyor and to load such articles on the discharge conveyor;

FIGURE 2 is a side elevational view of the apparatus shown in FIGURE 1;

FIGURE 3 is a sectional view taken on the line 3—3 of FIGURE 1; and

FIGURE 4 is a schematic wiring diagram.

Apparatus constructed in accordance with the invention is adapted for use in conjunction with a delivery conveyor designated generally by the reference character 1 and including an endless belt 2 or the like having horizontal upper and lower runs 3 and 4, respectively, trained around rollers 5, one of which is shown in FIGURE 3, and driven by conventional means (not shown) in such manner as to cause the upper run 3 to travel in the direction of the arrow $a$ in FIGURE 1. If desired, the delivery conveyor 1 may include side guide members 6 and 7, each composed of endless belts trained around rollers 8 and 9 and so arranged that their confronting runs travel in the same direction as the upper run 3 of the belt 2.

The delivery conveyor 1 is adapted to deliver goods to a transversely arranged discharge conveyor 10 which, in the illustrative embodiment, comprises supporting frame members 11 and 12 arranged parallel to one another and mounted on legs or the like (not shown), the frame members 11 and 12 being spanned by an article supporting member 13. Adjacent each side of the member 13 and on the upper surface of the latter is a chain or equivalent element 14, the elements 14 being spanned at intervals along their lengths by transverse carrier bars or flights 15 which ride upon the upper surface of the member 13 so as to engage articles on the support 13 and push them along the surface of the latter. The chains 14 may be endless and trained around sprockets 16 journaled on shafts 17 located at opposite ends of the conveyor 10, the chains being driven in any conventional manner so as to cause the flights 15 to move in the direction of the arrow $b$ in FIGURE 1.

Loader-accumulator apparatus constructed in accordance with the invention comprises a frame designated generally by the reference character 20 and includes a platform 21 positioned above the discharge conveyor 10. The lower surface of the platform is equipped with downwardly extending frame elements 22 which straddle the frame members 11 and 12 of the conveyor 10 and are secured to the latter by suitable means such as bolts 23 so as to fix the platform on the conveyor at a height above the latter sufficient to provide clearance for the flights 15. The mounting of the platform 21 should be such that its upper surface is at a level corresponding to or slightly below the level of the upper run 3 of the delivery belt 2.

Adjacent the delivery conveyor 1 the platform 21 is provided with upstanding guide rails 24 and 25, the latter rail being adjustable fore and aft and laterally of the platform 21 so as to accommodate different size packages. The adjusting means is of conventional construction and may comprise bolt and washer assemblies 26 which react between the lower surface of the platform 21 and the base 27 of the guide member 25.

Directly opposite the delivery conveyor 1 the platform 21 is provided with an upstanding stop rail 28 against which goods delivered to the platform by the delivery conveyor are adapted to come to rest. It will be understood that a plurality of articles, in single file, will be delivered to the platform 21 and that the endmost article will bear against the rail 28.

Mounted on the frame 20 is a housing 29 composed of vertical legs 30 welded or otherwise suitably secured to the platform 21 and fixed at their upper ends to a horizontal plate member 31. Within the housing 29 is mounted a pusher member 32 having an arm 33 aligned with the guide rail 24 and substantially spanning the distance between the rail 24 and the stop rail 28. To the rear face of the arm 33 is fixed one end of a reciprocable piston rod 34, its other end being secured to a piston (not shown) slideably mounted in a pneumatic or hydraulic cylinder 35 which is anchored to the platform 21 by suitable supporting members 36. The cylinder and piston constitute a double acting ram 37 and the opposite ends of the cylinder are provided with fluid lines 38 and 39, respectively, by means of which fluid may be introduced to and exhausted from the cylinder 35 on opposite sides of the piston so as to effect reciprocation of the latter.

At one end of the pusher arm 33 is mounted a rearwardly extending leg 40, at the rear end of which is a laterally extending operating foot 41 about which more will be said subsequently.

Atop the housing 29 is mounted a pusher member 42 having an arm 43 vertically aligned with the pusher arm 33 and being connected to a piston rod 44 which is reciprocable in a cylinder 45 that is mounted on the member 31 by suitable blocks 46. The piston 44 and the cylinder 45 also constitute a double acting ram 47 and the opposite ends of the cylinder are equipped with fluid lines 48 and 49 by means of which fluid may be introduced to and exhausted from the cylinder so as to effect reciprocation of the piston 44 and reciprocation of the pusher arm 43. One end of the arm 43 also has joined to it a rearwardly extending leg 50 that terminates in a laterally extending foot 51, the purpose of which will be described hereinafter.

As is best shown in FIGURE 2, the cylinder 45 is substantially longer than the cylinder 35. Consequently, the stroke of the piston 44 and the pusher arm 43 may be substantially longer than the stroke of the pusher arm 33.

As is most clearly shown in FIGURE 1, the fluid lines 48 and 49 connected to the cylinder 45 communicate with a housing 52 in which a pair of solenoid actuated valves operate to direct pressure fluid to one end or the other of the cylinder 45. The fluid is supplied through a line 53 which communicates with a source (not shown) of pressure fluid. In the illustrative embodiment of the invention, the ram 47 is designed for operation by compressed air, but it could be operated hydraulically if desired. The lines 38 and 39 of the cylinder 35 are similarly connected to a valve housing 54 (see FIGURE 3) which communicates with a source of compressed air or the like through a line 55, the housing 54 being provided with similar solenoid actuated valves.

To condition the apparatus thus far described for operation, the guide rails 24 and 25 are adjusted relatively to one another to permit a line of articles to pass in single file from the delivery conveyor 1 between the guide rails. The leading package or article will be pushed across the platform 21 by the force of additional articles being delivered to the apparatus by the conveyor 1 until such time as the leading package engages the stop wall 28. Depending on the sizes of the articles, there will be a plurality of articles arranged in single file across the platform 21 and parallel to the pusher arm 33. The section of the platform 21 which receives the line of articles directly from the conveyor 1 hereafter will be referred to as the receiving section of the apparatus.

When the leading article of a line of articles engages the stop wall 28, a normally open actuating switch 56 will be closed. Depending on the condition of the electrical circuit, yet to be described, the closing of the switch 56 will condition either the pusher arm 33 or the pusher arm 43 to be advanced in the direction of travel of the conveyor flights 15. Should the ram 37 be actuated to advance the pusher arm 33, the stroke of the latter is such that the line of goods on the receiving section of the platform 21 will be pushed forwardly toward the conveyor 10, but will not be pushed so far as to permit the row of articles to be discharged from the platform 21. Instead, the direction of travel of the pusher arm 33 will be reversed by engagement of the foot 40 with a normally open switch 57 and the stroke of the arm 33 is such that the line of goods will be permitted to remain on the platform 21 adjacent the discharge end of the latter. The platform section on which goods remain after operation of the pusher arm 33 hereinafter will be referred to as the loading section.

Articles pushed from the receiving section of the platform to the loading section will engage and depress a switch 58 mounted on the stop rail 28. Under certain conditions, as will be pointed out, depression of the switch 58 will condition the ram 47 for advancement of the pusher arm 43. The stroke of the arm 43 is such that all articles on both the receiving section and the loading section will be swept onto the discharge conveyor 10. When the pusher plate 43 has been advanced to its extreme forward position, the foot 51 will engage a normally open switch 59 that is mounted on the plate 31 so as to effect a reversal of movement of the arm 43.

During movements of either of the pusher arms 33 or 43, the associated legs 40 and 50 will block the delivery of any additional articles to the receiving section of the platform 21 until such time as the arms 33 and 43 are restored to their retracted positions.

The operation of the several parts of the apparatus can best be described by reference to FIGURE 4 which discloses a simplified, illustrative electrical circuit for operating the various parts of the apparatus. As is shown in FIGURE 4, the primary winding 60 of a transformer 61 has its terminals connected to a suitable source of alternating current and one of the terminals of its secondary coil 62 connected to ground and its other terminal to the actuating switch 56 through a wire 63. The switch 56 is connected by means of a wire 64 to the actuating switch 58 which, in its normal position, closes a circuit to ground through a solenoid 65 forming part of the valve mechanism 54 associated with the pusher arm 33. This circuit includes a wire 66 in which is located a manually manipulatable switch 68 which normally is closed when accumulation of goods is desired on the loading platform 21. The valve mechanism 54 includes the switch 57 which normally is open, but which may be closed by the foot 41 upon extension of the pusher arm 33 in the manner previously described.

The arrangement of the parts described thus far is such that closing of the actuating switch 56 by its engagement with articles delivered to the receiving section completes a circuit to the valve solenoid 65 so as to project the pusher arm 33 and push the goods from the receiving section to the loading section of the platform 21. When the goods are moved to the loading section, the goods will release the switch 56 allowing the latter to open. At the end of the forward stroke of the pusher arm 33, the switch 57 will be closed, thereby completing a circuit to the solenoid 68 so as to effect retraction of the pusher arm 33.

As the goods pass from the receiving section to the loading section of the platform they will engage and depress the switch 58. Depression of the switch 58 will break the circuit to the solenoid 65, but will condition a circuit through a contact from which extends a wire 69 leading to a normally open control switch 70. From the control switch 70 extends a wire 71 which leads to a solenoid 72 forming part of the valve mechanism 52. Energization of the solenoid 72 effects extension of the operating ram 47 so as to cause the pusher arm 43 to sweep across the receiving and loading sections of the platform 21 and discharge goods to the conveyor 10.

It will be apparent from FIGURE 4 that energization of the solenoid 72 cannot take place unless both of the switches 56 and 70 are closed. The switch 56 will be closed by additional goods being delivered to the receiving section, such additional goods being located between the previously moved goods and the pusher arm 33. As is shown in FIGURES 1 and 2, the control switch 70 is mounted on an arm 73 which is secured to the frame 20 and extends rearwardly from the latter so as to support the switch 70 in a position to be closed intermittently by the passage of each conveyor flight 15. Thus, the switch 70 will not be closed except upon the passage of a flight 15 past the switch 70 and, before the solenoid 72 can be energized to effect extension of the ram 47, the switch 56 also must be closed by goods having been delivered to the receiving section. Consequently, the discharge of goods to the conveyor 10 will be in timed relation to the speed of the latter.

When the pusher arm 43 has been extended to its forwardmost position, the foot 51 will engage the switch 59 so as to energize a solenoid 74 forming part of the valve mechanism 52 and effect retraction of the arm 43.

The foregoing description of the operation of the apparatus has been confined to the situation where a plurality of rows of articles are discharged simultaneously from the platform 21. Stated differently, a plurality of good have been accumulated on the platform 21 prior to their being discharged. In many instances it may be desirable to discharge goods from the platform in single rows. For example, half gallon packages of ice cream may be delivered by the conveyor 1, instead of quarts, in which event it may be preferable to discharge single rows of half gallon packages to the conveyor 10 rather than to accumulate more than one row of half gallon containers on the platform. This manner of operation may be achieved in the present construction by opening the manually controlled switch 67 and closing a manually controlled switch 75 located in a line 76 which bridges the switch 58. With the switch 67 open and the switch 75 closed, the simultaneous closing of the switches 56 and 70 will effect sequential operation of the solenoids 72 and 74 so as to extend and retract the pusher arm 43 and this action will take place each time a single file of packages is in position on the receiving section. Due to the opening of the switch 67, the valve mechanism 54 will be disabled from operation and consequently no operation of the ram 37 can take place.

The disclosed embodiment is representative of a presently preferred form of the invention, but is intended to be illustrative rather than definite thereof. The invention is defined in the claims.

We claim:

1. Material handling apparatus for receiving goods from a delivery conveyor or the like and loading them on a movable discharge conveyor, said apparatus comprising a frame having a goods receiving section to which goods are delivered from said delivery conveyor means and a loading section in communication with said receiving section; pusher means operable to engage goods on said receiving section and push them selectively to said loading section or to said discharge conveyor; and electrical circuit means, said circuit means having first actuating switch means located in the path of and operated by goods delivered to said receiving section, second actuating switch means located in the path of an operated by goods moving to said loading section, control switch means actuated by said discharge conveyor in timed relation to its rate of speed, and means interconnecting said first and second actuating switch means, said control switch means, and said pusher means for operating the latter in response to operation of either of said actuating switch means and said control switch means.

2. Material handling apparatus for receiving goods from a delivery conveyor and loading them on a discharge conveyor, said apparatus comprising receiving means for receiving goods from said delivery conveyor; first pusher means operable to push goods on said receiving means partially toward said discharge conveyor a distance sufficient to permit additional goods to be delivered to said receiving means; second pusher means operable to push said additional goods and the previously pushed goods onto said discharge conveyor; first actuating means supported in the path of and for operation by goods delivered to said receiving means; second actuating means supported in the path of and for operation by goods pushed partially toward said discharge conveyor; control means operated by said discharge conveyor in timed relation to its rate of travel; electric circuit means interconnecting said first actuating means, said control means and said pusher means and normally being capable of operating said first pusher means in response to operation of said control means and said first actuating means; and electric circuit means interconnecting said second actuating means, said first actuating means, said control means and said second pusher means operable to effect operation of the latter in response to operation of said second actuation means and said control means, said second mentioned interconnecting means including means disabling said first actuating means upon operation of said second actuation means.

3. Material handling apparatus for receiving goods from a delivery conveyor and loading them on a discharge conveyor, said apparatus comprising receiving means for receiving goods from said delivery conveyor; first pusher means operable to push goods on said receiving means partially toward said discharge conveyor; second pusher means operable to push the previously pushed goods and additional goods received from said delivery conveyor onto said discharge conveyor; first and second actuating means supported in the path of goods on said receiving means and operable respectively to effect operation of said first and second pusher means; control means operable by said discharge conveyor in timed relation to its rate of travel; and electrical circuit means interconnecting said control means, said pusher means and said first and second actuating means for operating said first and second pusher means sequentially in response to operation of said control means.

4. Material handling apparatus for receiving goods from a delivery conveyor and loading them on a discharge conveyor, said apparatus comprising a receiving frame having a goods receiving section aligned with said delivery conveyor and a goods loading section communicating with said receiving section and aligned with said discharge conveyor; a first pusher member adjacent said receiving section and adapted to push goods thereon to said loading section; first actuating means located in the path of and operable by goods delivered to said receiving section and operable to effect operation of said first pusher member; a second pusher member adjacent said receiving section and adapted to push goods on both of said sections to said discharge conveyor; second actuating means located in the path of and operable by goods delivered to said loading section; and electrical circuit means interconnecting said first and second actuating means with said first and second pusher members, said circuit means including control switch means for operation by said discharge conveyor in timed relation to the rate of travel thereof and being operable to effect selective operation of said first and second pusher members in conjunction with the operation of said first and second actuating means.

5. Material handling apparatus for receiving goods from a delivery conveyor and loading them on a discharge conveyor, said apparatus comprising a frame having a first section adapted to receive goods from said delivery conveyor and a second section communicating with said first section and adapted to deliver goods therefrom to said discharge conveyor; a first pusher member adjacent said first section and operable to push goods therefrom to said second section; first actuating means electrically connected to said first pusher member for actuating the latter and located in the path of and operable by goods delivered to said first section; a second pusher member adjacent said first section and operable to push goods from both of said sections to said discharge conveyor; second actuating means electrically connected to said second pusher member and to said first actuating means and located in the path of goods delivered to said second section from said first section, said second actuating means being operable to effect operation of said second pusher member when both of said actuating means are operated; and electrical control means operable intermittently by said discharge conveyor and electrically connected to said first and second actuating means for disabling the operation of either of the pusher members except upon operation of said control means.

6. Material handling apparatus for receiving goods from a delivery conveyor or the like and loading them on a movable discharge conveyor, said apparatus comprising frame means straddling said discharge conveyor and having a first section arranged to receive goods from said delivery conveyor and a second section communicating with said first section and with said discharge conveyor; first pusher means supported on said frame means adjacent said first section and operable to push goods from said first section to said second section; first actuating means located in the path of and operable by goods delivered to said first section; second pusher means supported by said frame means adjacent said first section and operable to push goods from both of said sections to said discharge conveyor; control means electrically connected to said first and second actuating means supported by said frame means and operable intermittently by said discharge conveyor; and electrical circuit means connecting said first and second pusher means, said circuit means including manipulatable means operable to effect sequential operation of said first and second pusher means or to disable said first pusher means and effect operation of said second pusher means in response to operation of said first actuating means and said control means.

References Cited in the file of this patent

UNITED STATES PATENTS

| | | |
|---|---|---|
| 1,117,433 | Owens | Nov. 17, 1914 |
| 1,881,895 | Olson | Oct. 11, 1932 |
| 1,901,928 | Olson | Mar. 21, 1933 |
| 2,923,420 | Dyer | Feb. 2, 1960 |